United States Patent
Wagner et al.

(10) Patent No.: US 7,422,410 B1
(45) Date of Patent: Sep. 9, 2008

(54) LIFT ATTACHMENT FOR USE WITH A THREE-POINT HITCH OF A TRACTOR

(76) Inventors: Robert J. Wagner, 610 W. Railroad St., Whitehall, MT (US) 59759; Benjamin J. Wagner, 610 W. Railroad St., Whitehall, MT (US) 59759

( * ) Notice: Subject to any disclaimer, the term of this patent is extended or adjusted under 35 U.S.C. 154(b) by 327 days.

(21) Appl. No.: 11/304,501

(22) Filed: Dec. 15, 2005

Related U.S. Application Data

(60) Provisional application No. 60/636,341, filed on Dec. 15, 2004.

(51) Int. Cl.
*B66F 9/06* (2006.01)
(52) U.S. Cl. .................. 414/703; 187/238; 414/629
(58) Field of Classification Search ............. 414/628, 414/629, 703; 187/238, 230, 226
See application file for complete search history.

(56) References Cited

U.S. PATENT DOCUMENTS

| | | |
|---|---|---|
| 3,957,167 A | 5/1976 | Jacobson et al. |
| 4,268,210 A | 5/1981 | Ferguson et al. |
| 4,345,871 A | 8/1982 | Kalif |
| 4,537,549 A | 8/1985 | Knels |
| 4,597,703 A | 7/1986 | Bartolini |
| 4,640,662 A | 2/1987 | Spellman, Jr. |
| 4,940,096 A | 7/1990 | Johnson |
| 5,178,505 A | 1/1993 | Smith |
| 5,290,133 A | 3/1994 | Riley |
| 5,556,245 A | 9/1996 | Moss |
| 6,065,926 A | 5/2000 | Knapp |
| 6,068,086 A | 5/2000 | Bushong et al. |

*Primary Examiner*—Donald Underwood
(74) *Attorney, Agent, or Firm*—Richard C. Conover

(57) ABSTRACT

A lift attachment for a tractor provided with a three-point hitch. A slide assembly is provided for slidable movement in the vertical direction within channel guides. A double acting hydraulic cylinder is connected to the slide assembly for moving the slide assembly either upwardly or downwardly. Lifting tines are connected to the slide assembly. A cam mechanism is provided on the lifting tines to tilt the outer ends of the tines upwardly when the tines are raised and allows the tines to tilt downwardly to a level position when the lifting tines are lowered.

4 Claims, 5 Drawing Sheets

U S 7,422,410 B1

LIFT ATTACHMENT FOR USE WITH A THREE-POINT HITCH OF A TRACTOR

This application claims the benefit of provisional application Ser. No. 60/636,341 filed Dec. 15, 2004.

BACKGROUND OF THE INVENTION

The present invention relates to a lift attachment for use with a three-hitch of a tractor and can be used for lifting and transporting pallets carrying a load.

Forklift lift type devices for attachment to a three-point hitch of a tractor are known such as shown in U.S. Pat. No. 3,957,167 to Jacobson et al. In these known devices, load resting on the extending fork members are lifted using the three-point hitch assembly. There have been problems with using this type of lifting device for the reason that when heavy loads are to be lifted, the three-point hitch assembly is simply insufficient to lift the load. Further, there are no known devices which can be attached to the three-point hitch of a tractor and utilized to lift at least two pallets of heavy materials such as sod which device can lift the pallets independently of each other and without using the three-point lifting arms of the tractor.

SUMMARY OF INVENTION

The present invention relates to a lift attachment for use with a three-point hitch of a tractor but wherein the three-point hitch is only used for towing the attachment. Hydraulic cylinders are used to perform the lifting of the pallets and in a preferred embodiment, two pallet lifters are provided which can be used independently of one another for lifting large loads. The present invention includes slide assemblies that are moved vertically either up or down under positive control in channel guides provided in the frame assembly.

Further, the present invention utilizes a cam mechanism provided on the lifting tines to tilt the outer ends of the tines upwardly when the lifting tines are raised and allows the tines to tilt downwardly to a level position when the lifting tines are lowered.

Further, the present invention utilizes an electric solenoid for directing the fluid flow to double acting hydraulic cylinders associated with the slide assemblies so that positive control of a selected slide assembly is available.

BRIEF DESCRIPTION OF DRAWINGS

In order that the invention may be clearly understood and readily carried into effect, a preferred embodiment of the invention will now be described, by way of example only, with reference to the accompanying drawings wherein.

DESCRIPTION OF A PREFERRED EMBODIMENT

Figure 1:
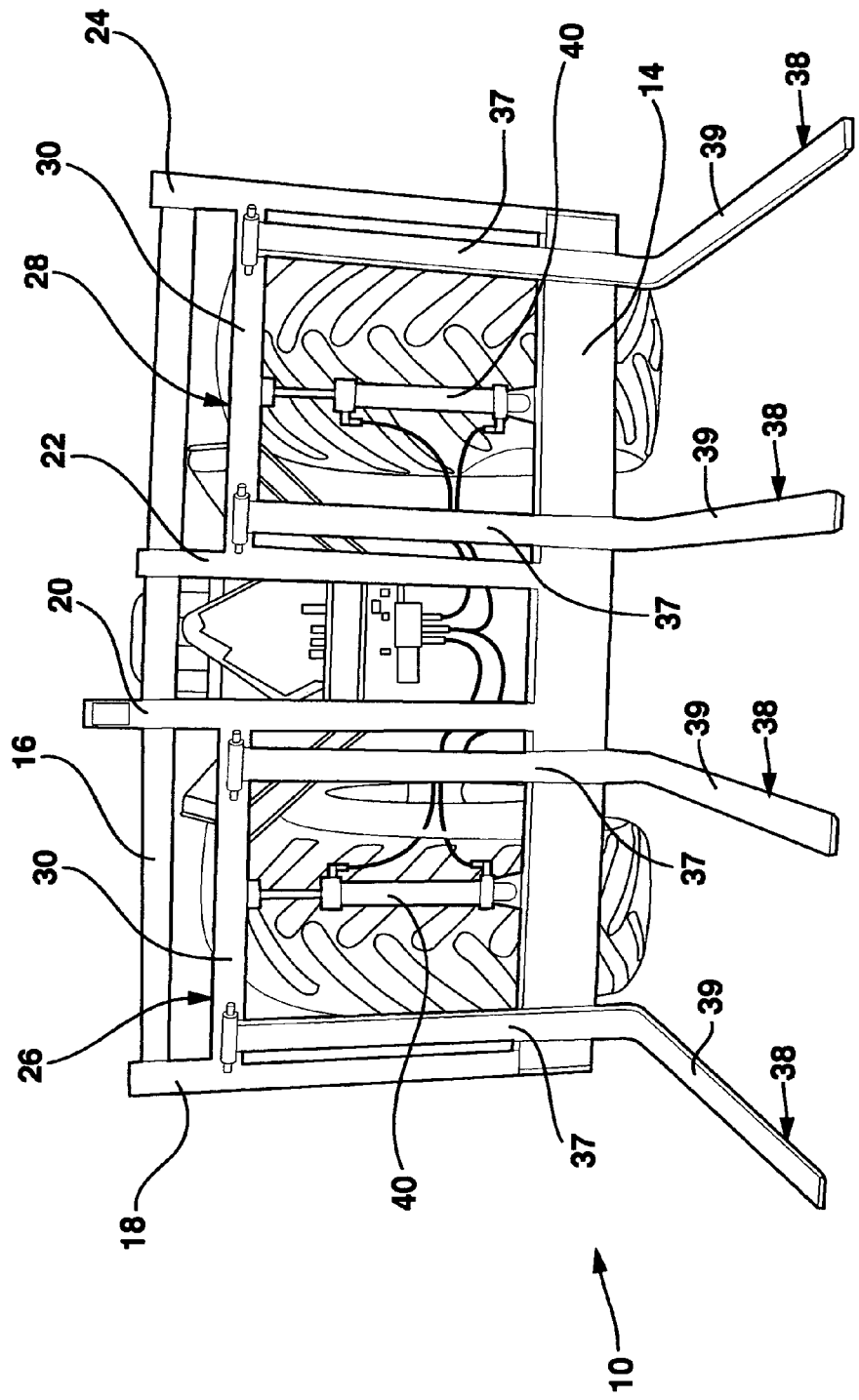
FIG. 1 is a front perspective view of a lift attachment according to the present invention.
Figure 2:
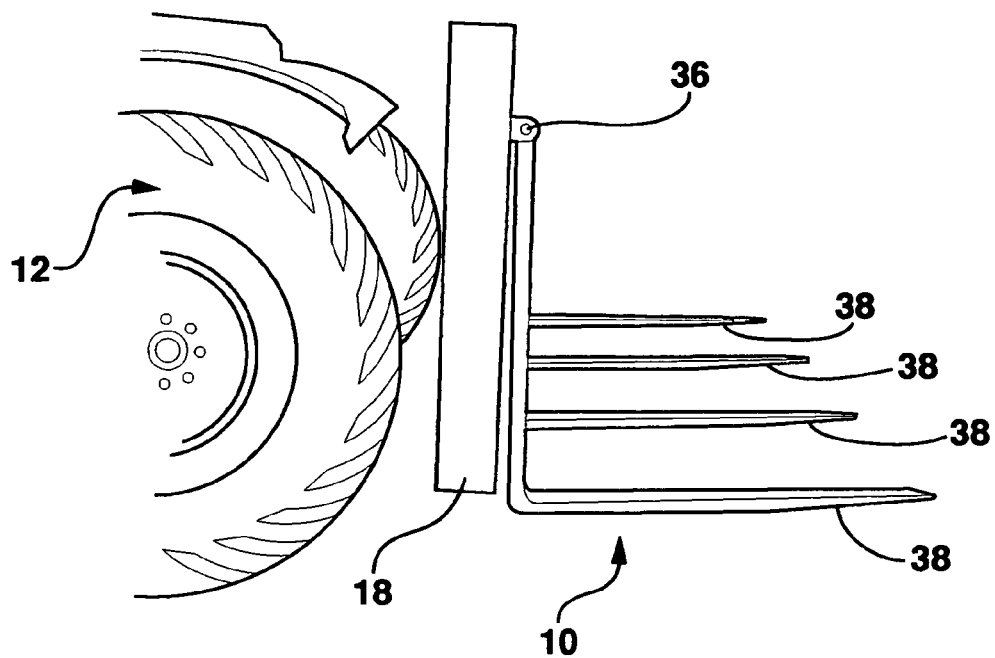
FIG. 2 is a left side perspective view of the invention shown in FIG. 1.

A lift attachment 10 according to the present invention is shown in FIGS. 1 and 2. The lift attachment 10 is mounted to a tractor 12 using a conventional three point hitch of the tractor.

The lift attachment 10 includes a bottom beam 14 and an upper brace member 16. Four open face channel guides 18, 20, 22, and 24 are mounted to the bottom beam 14 as by welding and extend in an upward direction. The open faces of guides 18 and 20 face one another and the open faces of guides 22 and 24 face one another.

Figure 3:
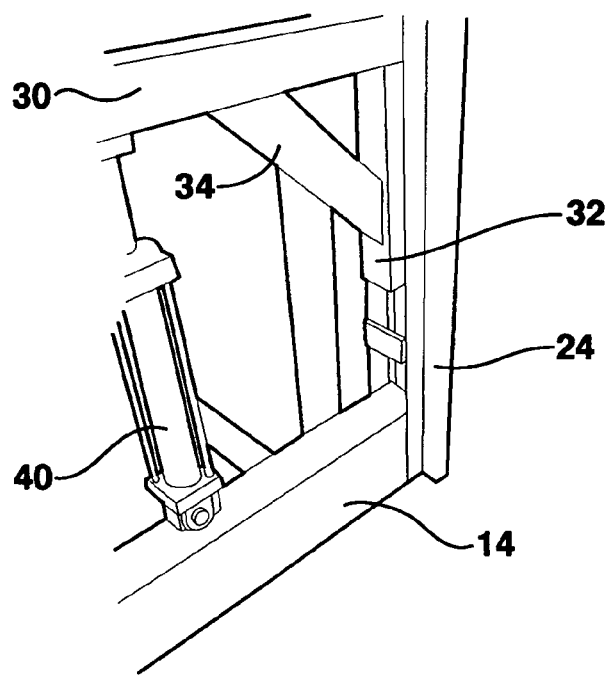
FIG. 3 is a detail perspective view of a portion of a slide assembly used with the present invention.

A slide assembly 16 is slidably mounted between guides 18 and 20 and a second slide assembly 28 is slidably mounted between channel guides 22 and 24. Each of the slide members 26 and 28 include an upper beam 30. At each end of the beams 30, a slide member 32 is secured thereto in depending relation as shown in FIG. 3. The slide member 32 is sized to fit within the respective channel guide 18, 20, 22 or 24. A cross brace 34 extends between the cross member 30 and the slide member 32. With this arrangement, the slide assembly 26 can slidably move up or down between channel guides 18 and 20 and the slide assembly 28 can independently move up or down within channel guides 22 and 24.

Figure 4:
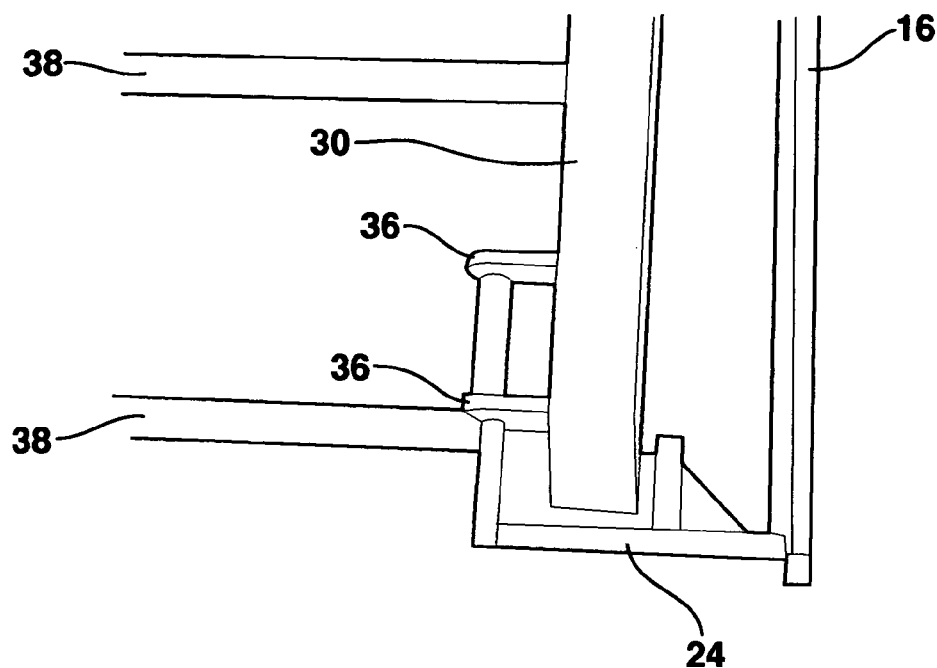
FIG. 4 is a detail top perspective view of a channel guide used with the present invention.

A pair of spaced apart flanges 36 are secured to the cross member 30 as shown in FIG. 4. The flanges 36 support a pin (not shown) for rotatably securing thereto a tine 38 as shown in FIGS. 1, 2, and 4. Each tine 38 includes an upwardly extending member 37 and a rearwardly extending member 39 connected together in orthogonal relation.

Figure 5:
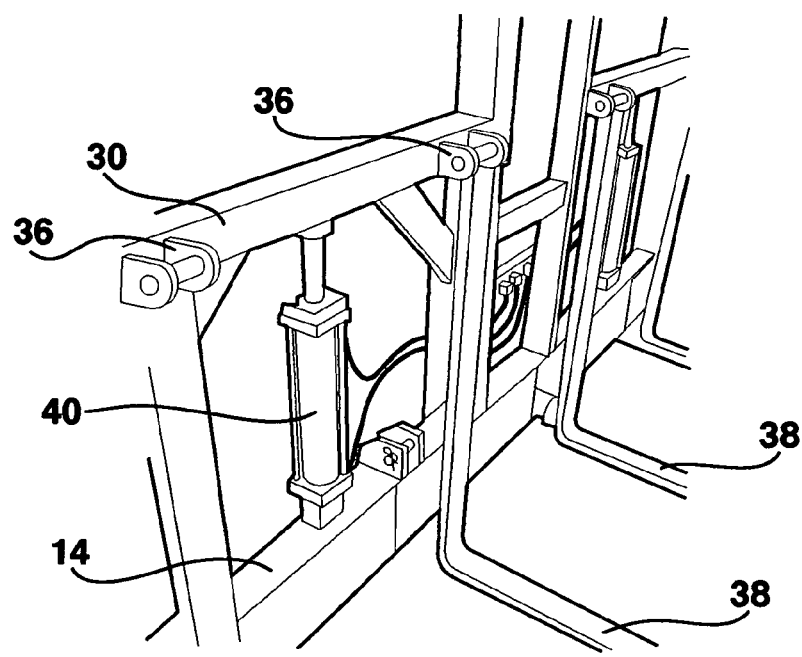
FIG. 5 is a detail perspective view of a slide assembly and hydraulic cylinder used with the present invention.
Figure 6:
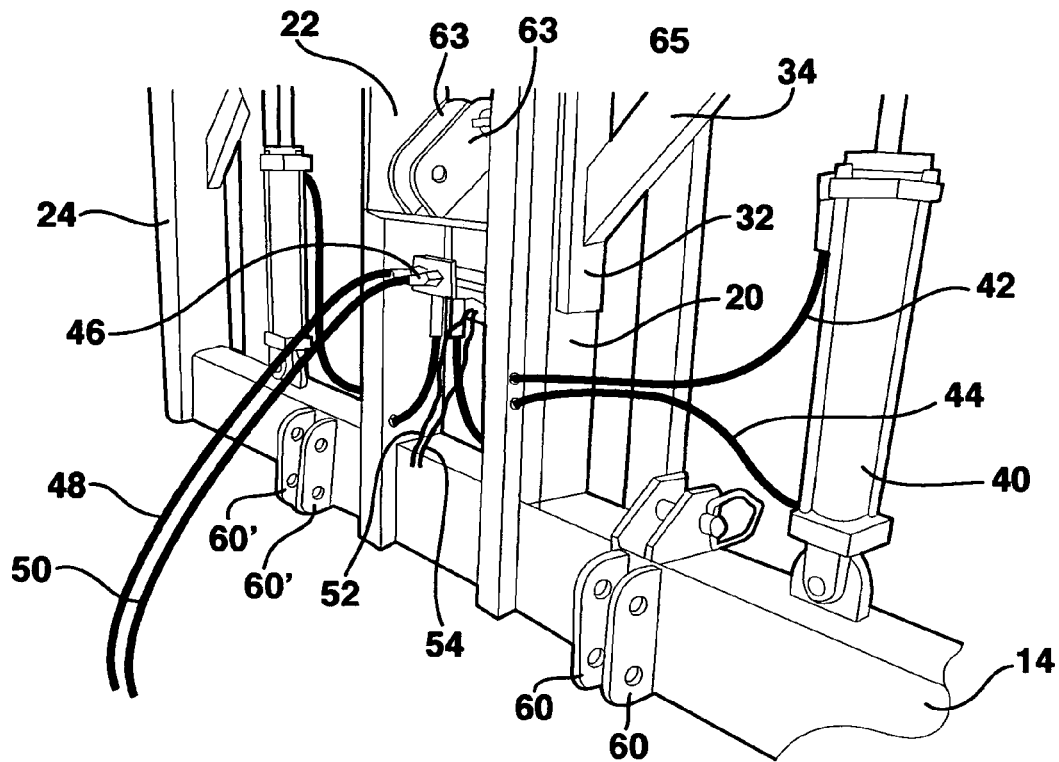
FIG. 6 is rear detail perspective view of the invention shown in FIG. 1.

A double acting hydraulic cylinder 40 is mounted between the bottom beam 14 and each of the beams 30 as shown in FIG. 1 and FIG. 5. Each of the hydraulic cylinders 40 are actuated with a pair of hydraulic hoses 42 and 44 as shown in FIG. 6. The hydraulic hoses 42 and 44 are fluidly connected to an electronically actuated solenoid valve 46. The solenoid valve 46 is fluidly connected to the hydraulic system of the tractor 12 with hydraulic hoses 48 and 50 as shown in FIG. 6. The solenoid valve is electrically actuated with electric wires 52 and 54. The electric wires 52 and 54 are connected to a switch (not shown) located adjacent to the driver's seat provided with the tractor 12. The switch is used to control which hydraulic cylinder 40 is to be actuated and also whether the selected hydraulic cylinder moves the associated slide assembly either upwardly or downwardly.

Figure 7:
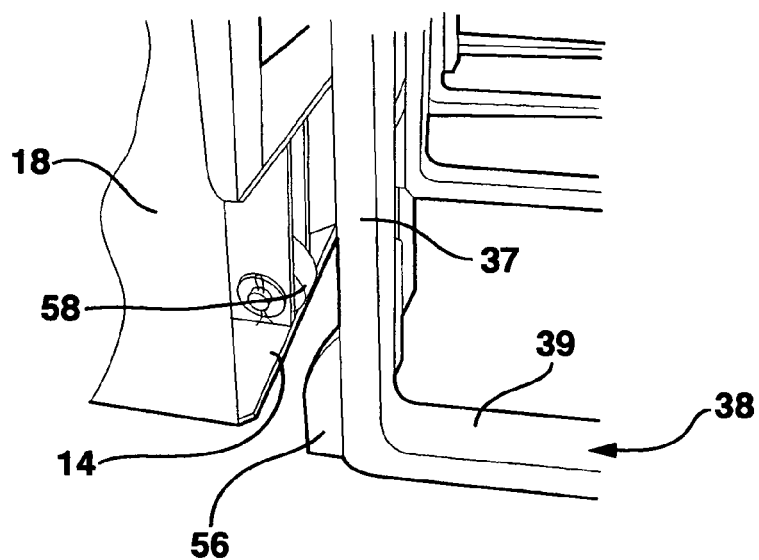
FIG. 7 is a left side detail view of the invention shown in FIG. 1.

A ramp 56 is mounted at the lower end of each tine 38 to face in a rearward direction toward the bottom beam as shown in FIG. 7. A pin mounted roller assembly 58 associated with the ramp 56 of tine 38 is mounted to beam 14 (one of which is shown in FIG. 7). The roller assemblies 58 are positioned to engage the ramps 56 when the tines 38 are raised to their uppermost position. When this occurs the forward ends of tines 38 are tilted upwardly. Further, the roller assemblies 58 are positioned to disengage from the ramps 56 when the tines 38 are lowered to their lowest position. When this occurs the tines 38 are allowed to tilt downwardly to a level position.

Figure 8:
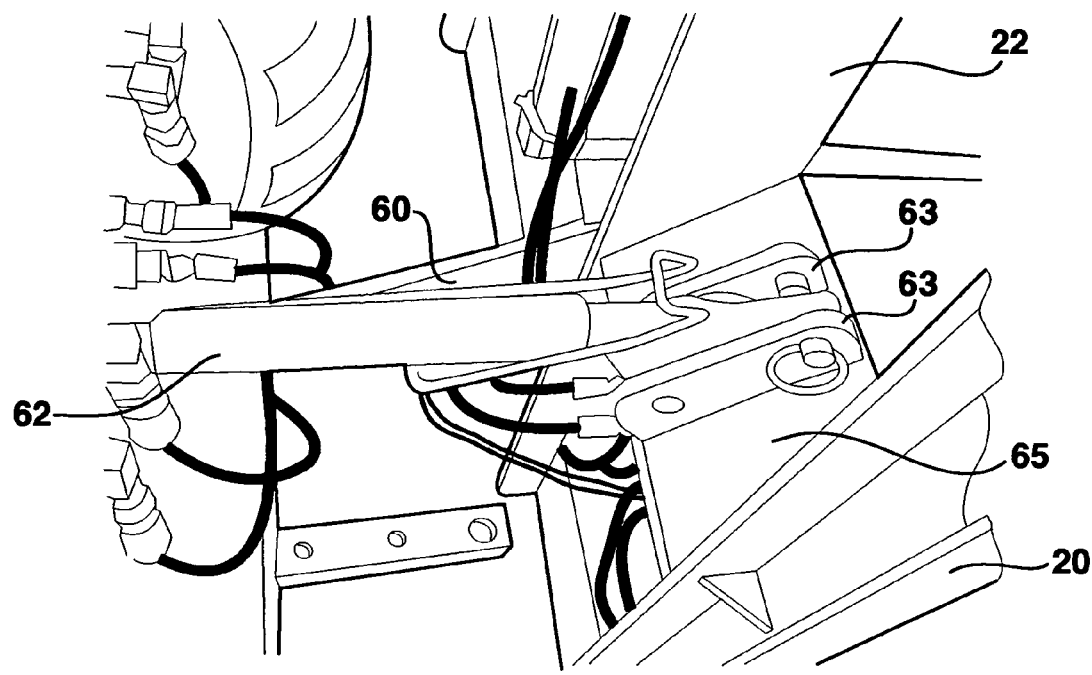
FIG. 8 is a detail view of a conventional three-point hitch used to connect the present invention to a tractor.

The lift attachment 10 is mounted to a conventional three-point hitch of a tractor having two parallel draft arms 60 (only one of which is shown in FIG. 8) and an upper pivoted arm 62 as shown in FIG. 8 which is mounted above and between the draft arms 60. Two pairs of apertured mounting plates 61 and 61' are mounted to a side of the bottom beam 14 in 14 facing the tractor as shown in FIG. 6. These mounting plates 61 and 61' are used to connect the draft arms 60 to the lift attachment 10 with pins (not shown). A pair of apertured mounting plates 63 are attached to a mounting plate 65 secured between channel members 20 and 22 as shown in FIG. 6. The mounting plates 63 are used to connect the pivotal arm 62 to the lift attachment 10 with a pin (not shown).

In operation, each of the slide assemblies 26 and 28 can be operated independently by switching a control switch (not shown) controlling the electronic solenoid valve 46. When the desired slide assembly 26 or 28 has been thus actuated, the operator of the tractor can use the conventional hydraulic pump of the tractor to force hydraulic fluid through hoses 48 and 50 to the appropriate hydraulic cylinder 40 through hoses 42 and 44. Since the hydraulic cylinders 40 are double acting, depending on which direction the fluid is moving through hoses 42 and 44, the respective slide assembly can be either moved upwardly or lowered under positive control.

When a sod pallet is to be lifted, the tines 38 are lowered with the selected slide assembly 26 or 28 to the lower most position where the tines 38 can slide underneath the pallet to be lifted. The ramps 56 are disengaged with the roller assemblies 58 and the rearwardly extending members 39 of the tines 38 are in a level position. The tractor is then driven in reverse until the appropriate tines 38 are located underneath the sod pallet to be lifted. Next the selected hydraulic cylinder 40 can be actuated to lift the selected slide assembly 26 or 28 thereby lifting the selected sod pallet off the ground to a position where it can be transported to a desired location. By lifting the tines 38 upwardly, the roller assemblies 58 engage the ramps 56 and the forward ends 39 of tines 38 are pivoted slightly upwardly. In this manner the pallet being lifted is gravity loaded against the upwardly extending members 37 of the tines 38.

Figure 9:
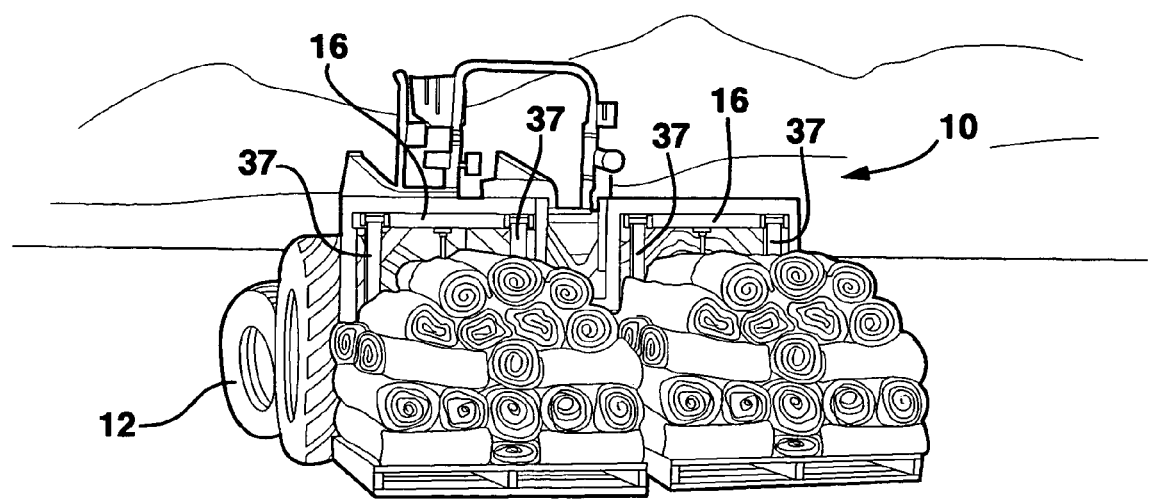
FIG. 9 is a perspective view of the present invention mounted to a tractor showing two sod pallets which have been lifted using the present invention.

Since the lift attachment 10 has two independently operated slide assemblies 26 and 28, two sod pallets may be moved at the same time thereby reducing the time necessary to transport sod pallets to a desired location. The lift attachment 10 holding two sod pallets in a transportable position is shown in FIG. 9.

The lift attachment 10 as described above was directed to a preferred embodiment having a double pallet lift assembly. It is also contemplated that a single pallet lift assembly could be constructed according to the present invention by downsizing and having only one pallet lifter mounted to a three-point hitch of a tractor.

While the fundamental novel features of the invention have been shown and described, it should be understood that various substitutions, modifications, and variations may be made by those skilled in the art without departing from the spirit or scope of the invention. Accordingly, all such modifications or variations are included in the scope of the invention as described by the following claims:

We claim:

1. A lift attachment for a tractor provided with a three-point hitch having two parallel draft arms with rearwardly extending ends and an upper pivoted arm mounted above and between the draft arms comprising:

a laterally extending bottom beam;
a first and second open face channel guides each having one end secured to the bottom beam, the channel guides secured to the bottom beam in spaced apart and opposing relation and extending in an upward direction with the open faces of the channel guides facing one another;
a laterally extending upper brace member secured to the upper free ends of the channel guides;
a slide assembly movable between an upper position and a lower position, the slide assembly positioned between the first and second channel guides;
the slide assembly further having an upper beam with a first and a second end;
a first slide member mounted to the first end of the upper beam and sized to fit within the open face of the first channel member for slidable movement within the channel guide and a second slide member mounted to the second end of the upper beam and sized to fit within the open face of the second channel guide for slidable movement within the second channel guide;
at least one tine mounted to the upper beam of the slide assembly,
a double acting hydraulic cylinder, having an extendable piston, connected between the bottom beam and the upper beam of the slide assembly whereby when the piston is extended, the slide assembly is moved vertically upwardly within the channel guides and when the piston is retracted, the slide assembly is moved vertically downwardly within the channel guides;
a pair of hydraulic hoses connected to the double acting hydraulic cylinder for providing a fluid path for hydraulic fluid to the hydraulic cylinder to either extend the piston or retract the piston;
an electrically actuated solenoid connected in the fluid path provided by the pair of hydraulic hoses for controlling the direction of fluid flow through the hydraulic hoses;
electrical control means for actuating the electrical solenoid to either extend the piston or retract the piston;
means for connecting the bottom beam to the rearward ends of the two parallel draft arms of the three-point hitch; and
means for connecting the upper pivoted arm of the three-point hitch to a mounting plate above the bottom beam and below the upper brace member.

2. The lift attachment according to claim 1 wherein each tine has an "L"-shaped configuration with an upwardly extending member connected to a rearwardly extending member and wherein the upwardly extending member of the tine is pivotally mounted to the upper beam of the slide assembly and further includes a ramp block mounted to each tine on the side facing the tractor at a bottom end of the upwardly extending member and further including a roller assembly mounted to the bottom beam for engagement with the ramp block when the slide assembly moves to the upper position and for disengagement with the ramp block when the slide assembly is lowered to the lower position.

3. A lift attachment for a tractor provided with a three-point hitch having two parallel draft arms with rearwardly extending ends and an upper pivoted arm mounted above and between the draft arms comprising:

a laterally extending bottom beam;
a first pair of open face channel guides secured to the bottom beam, the channel guides secured to the bottom beam in spaced apart and opposing relation and extending in an upward direction with the open faces of the channel guides facing one another;
a second pair of open face channel guides secured to the bottom beam in side-to-side relation with the first pair of open face channel guides, the channel guides of the second pair secured to the bottom beam in spaced apart and opposing relation and extending in an upward direction with the open faces of these channel guides facing one another;

a laterally extending upper brace member secured to the upper free ends of the four open face channel guides;

a separate slide assembly associated with each pair of open face channel guides and positioned between a respective pair of channel guides;

each slide assembly having an upper beam with a first and a second end;

each slide assembly further having a first slide member mounted to the first end of the upper beam and sized to fit with the open face of one of the associated channel guides for slidable movement within the channel guide and a second slide member mounted to the second end of the beam and sized to fit within the open face of the other associated channel guide for slidable movement within this channel guide;

at least one tine mounted to the upper beam of each slide assembly, a double acting hydraulic cylinder, having an extendable piston, associated with each of the slide assemblies, the double acting hydraulic cylinders connected between the bottom beam and the upper beam of the associated slide assembly whereby when the piston is extended the slide assembly is moved vertically upwardly within the associated channel guide and when the piston is retracted the slide assembly is moved vertically downwardly within the associated channel guide;

a pair of hydraulic hoses connected to each of the double acting hydraulic cylinders for providing a fluid path for hydraulic fluid to the respective hydraulic cylinder to either extend the piston or retract the piston;

an electrically actuated solenoid connected in the fluid path provided by each pair of hydraulic hoses for controlling the direction of fluid flow through the respective hydraulic hoses;

electrical control means for actuating the electrical solenoid to either extend the piston or retract the piston of a selected hydraulic cylinder;

means for connecting the bottom beam to the rearward ends of the two parallel draft arms of the three-point hitch; and means for connecting the upper pivoted arm of the three-point hitch to a mounting plate above the bottom beam and below the upper brace member.

4. The lift attachment according to claim 1 wherein each tine has a "L"-shaped configuration with an upwardly extending member and a rearwardly extending member and wherein the upwardly extending member of the tine is pivotally mounted to the upper beam of the respective slide assembly and further includes a ramp block mounted to each tine on the side facing the tractor a bottom end of the upwardly extending member and further including a roller assembly mounted to the bottom beam for engagement with the ramp blocks when the selected slide assembly moves to the upper position and for disengagement with the ramp blocks when the selected slide assembly is lowered to the lower position.

* * * * *